US006751343B1

(12) United States Patent
Ferrell et al.

(10) Patent No.: US 6,751,343 B1
(45) Date of Patent: Jun. 15, 2004

(54) METHOD FOR INDEXING AND RETRIEVING MANUFACTURING-SPECIFIC DIGITAL IMAGERY BASED ON IMAGE CONTENT

(75) Inventors: Regina K. Ferrell, Knoxville, TN (US); Thomas P. Karnowski, Knoxville, TN (US); Kenneth W. Tobin, Jr., Harriman, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,394

(22) Filed: Sep. 20, 1999

(51) Int. Cl.[7] .............................. G06K 9/00; G06K 9/46; G06K 9/68
(52) U.S. Cl. ....................... 382/145; 382/218; 382/226; 382/195
(58) Field of Search ................................ 382/112, 141, 382/142, 143, 144, 145, 146, 147, 148, 149, 150, 190, 195, 203, 217, 218, 219, 225, 226, 240; 348/125, 126; 700/117; 707/104.1

(56) References Cited

U.S. PATENT DOCUMENTS

| | | | | |
|---|---|---|---|---|
| 5,751,286 | A | | 5/1998 | Barber et al. ............... 345/835 |
| 5,793,888 | A | | 8/1998 | Delanoy .................. 382/219 |
| 5,815,198 | A | * | 9/1998 | Vachtsevanos et al. ..... 348/125 |
| 5,819,288 | A | | 10/1998 | De Bonet ...................... 707/2 |
| 6,269,179 | B1 | * | 7/2001 | Vachtsevanos et al. ..... 348/126 |
| 6,292,582 | B1 | * | 9/2001 | Lin et al. .................... 348/126 |
| 6,330,353 | B1 | * | 12/2001 | Lai et al. .................... 382/147 |
| 6,401,000 | B1 | * | 6/2002 | Suzuki et al. ............... 700/117 |
| 6,546,137 | B1 | * | 4/2003 | Lai et al. .................... 382/217 |

OTHER PUBLICATIONS

Marefat et al, A Framework for Image Interpretation in Manufacturing Applications, 1990, IEE paper, ISBN: 0000–0569, pp. 569–574.*

(List continued on next page.)

Primary Examiner—Mehrdad Dastouri
(74) Attorney, Agent, or Firm—Akerman Senterfitt (57) ABSTRACT

A method for indexing and retrieving manufacturing-specific digital images based on image content comprises three steps. First, at least one feature vector can be extracted from a manufacturing-specific digital image stored in an image database. In particular, each extracted feature vector corresponds to a particular characteristic of the manufacturing-specific digital image, for instance, a digital image modality and overall characteristic, a substrate/background characteristic, and an anomaly/defect characteristic. Notably, the extracting step includes generating a defect mask using a detection process. Second, using an unsupervised clustering method, each extracted feature vector can be indexed in a hierarchical search tree. Third, a manufacturing-specific digital image associated with a feature vector stored in the hierarchicial search tree can be retrieved, wherein the manufacturing-specific digital image has image content comparably related to the image content of the query image. More particularly, can include two data reductions, the first performed based upon a query vector extracted from a query image. Subsequently, a user can select relevant images resulting from the first data reduction. From the selection, a prototype vector can be calculated, from which a second-level data reduction can be performed. The second-level data reduction can result in a subset of feature vectors comparable to the prototype vector, and further comparable to the query vector. An additional fourth step can include managing the hierarchical search tree by substituting a vector average for several redundant feature vectors encapsulated by nodes in the hierarchical search tree.

25 Claims, 9 Drawing Sheets

OTHER PUBLICATIONS

Mehmet Celenk, Hierarchical Color Clustering for Segmentation of Textured Images, 1997, IEEE Paper ISBN: 0–8186–7873, pp. 483–487.*

Chu et al, Knowledge–Based Image Retrieval with Spatial and Temporal Constructs, Dec. 1998, IEEE Paper ISBN: 1041–4347, vol. 10, No. 6, pp. 872–888.*

"Content–Based Image Retrieval Systems," Gudivada and V.V. Raghavan, IEEE Computer Magazine, 0018–9162, Sep. 1995, p. 18–22.

"Indexing Pictorial documents By Their Content: A Survey of Current Techniques," Imaging and Vision Computing, M.De Marsicoi, L. Cinque, and S. Levialdi, vol. 15, 1997, p. 119–141.

"A Knowledge–Based Approach for Retrieving Images by Content", IEEE Transactions on Knowledge and Data Engineering, Chih–Cheung Hsu, Wesley W. Chu, Ricky K. Taira, vol. 8, No. 4, Aug. 1996, pp. 522–532.

"Design of Large Intelligent Image Database Systems", vol. 11, 1996, p.347–365.

"Image Retrieval and Pattern Recognition". SPIE, vol. 2916, 1996, p. 130–139.

* cited by examiner

| Area of Interest | Plane | Feature | Descriptor |
|---|---|---|---|
| Background | Blue | Inner Average Intensity | Color |
| | Green | Inner Average Intensity | Color |
| | Red | Inner Average Intensity | Color |
| | Gray | Inner Invariant Moment1 | Shape |
| | Gray | Inner Invariant Moment2 | Shape |
| | Gray | Inner Invariant Moment3 | Shape |
| | Gray | Inner Invariant Moment4 | Shape |
| | Gray | Inner Invariant Moment5 | Shape |
| | Gray | Inner Invariant Moment6 | Shape |
| | Gray | Inner Invariant Moment7 | Shape |
| | Sobel | Inner Average Intensity | Texture |
| | Sobel | Inner Energy | Texture |
| | Gray | Inner Average Intensity | Texture |
| | Gray | Inner Contrast | Texture |
| | Gray | Inner Energy | Texture |
| Defect | Blue | Annular Average Intensity | Color |
| | Blue | Inner Average Intensity | Color |
| | Blue | Outer Average Intensity | Color |
| | Green | Annular Average Intensity | Color |
| | Green | Inner Average Intensity | Color |
| | Green | Outer Average Intensity | Color |
| | Red | Annular Average Intensity | Color |
| | Red | Inner Average Intensity | Color |
| | Red | Outer Average Intensity | Color |
| | Gray | Annular Average Intensity | Texture |
| | Gray | Annular Contrast | Texture |
| | Gray | Annular Energy | Texture |
| | Gray | Inner Average Intensity | Texture |
| | Gray | Inner Contrast | Texture |
| | Gray | Inner Energy | Texture |
| | Gray | Outer Average Intensity | Texture |
| | Gray | Outer Contrast | Texture |
| | Gray | Outer Energy | Texture |
| | Sobel | Annular Average Intensity | Texture |
| | Sobel | Annular Energy | Texture |
| | Sobel | Inner Average Intensity | Texture |
| | Sobel | Inner Energy | Texture |
| | Sobel | Outer Average Intensity | Texture |
| | Sobel | Outer Energy | Texture |
| | Inner | Area | Shape |
| | Inner | Compactness | Shape |
| | Inner | Elongation | Shape |
| | Inner | Perimeter | Shape |
| | Gray | Inner Invariant Moment1 | Shape |
| | Gray | Inner Invariant Moment2 | Shape |
| | Gray | Inner Invariant Moment3 | Shape |
| | Gray | Inner Invariant Moment4 | Shape |
| | Gray | Inner Invariant Moment5 | Shape |
| | Gray | Inner Invariant Moment6 | Shape |
| | Gray | Inner Invariant Moment7 | Shape |
| Global | Gray | Inner Average Intensity | Texture |
| | Gray | Inner Contrast | Texture |
| | Gray | Inner Energy | Texture |
| | Sobel | Inner Average Intensity | Texture |
| | Sobel | Inner Energy | Texture |
| | Green | Inner Average Intensity | Color |
| | Red | Inner Average Intensity | Color |
| | Blue | Inner Average Intensity | Color |

METHOD FOR INDEXING AND RETRIEVING MANUFACTURING-SPECIFIC DIGITAL IMAGERY BASED ON IMAGE CONTENT

STATEMENT REGARDING FEDERALLY SPONSORED RESEARCH OR DEVELOPMENT

This invention was made with government support under contract DE-AC05-96OR22464, awarded by the United States Department of Energy to Lockheed Martin Energy Research Corporation. The United States government has certain rights in this invention.

CROSS REFERENCE TO RELATED APPLICATIONS (Not Applicable)

BACKGROUND OF THE INVENTION

1. Technical Field

This invention relates to the field of content-based image retrieval and more particularly to a method and apparatus for indexing and retrieving manufacturing-specific digital imagery based upon image content.

2. Description of the Related Art

Images are being generated at an ever-increasing rate by sources such as defense and civilian satellites, military reconnaissance and survelliance flights, fingerprinting and mug-shot-capturing devices, scientific experimentation, biomedical imaging, architectural and engineering design, and industrial manufacturing. In consequence, image knowledge structure and an access method for retrieving images are two significant problems in the design of large intelligent image database systems. Content-based image retrieval [CBIR] represents a promising and cutting-edge technology useful in addressing the problem of high-speed image storage and retrieval. Specifically, CBIR refers to techniques used to index and retrieve images from databases based on their pictorial content.

Typically, pictorial content is defined by a set of features extracted from an image that describes the color, texture, and/or shape of the entire image or of specific objects. This feature description is used in CBIR to index a database through various means such as distance-based techniques, rule-based decision making, and fuzzy inferencing. Yet, to date, no significant work has been accomplished to apply these technologies to the manufacturing environment. Notwithstanding, imagery collected from the manufacturing processes have unique characteristics that can be taken advantage of in developing a manufacturing-specific CBIR approach.

The manufacturing environment represents an application area where CBIR technologies have not been extensively studied. The low cost of computer systems, memory, and storage media have resulted in manufacturers collecting and storing more information about the manufacturing process. Much of the data being stored is product imagery collected from automated inspection tools. This imagery contains an historical record of manufacturing events that cause a reduction in product quality. Under the proper circumstances this data can be used to rapidly source product quality issues and improve product yield.

Semiconductor manufacturing is representative of an industry that has a mature computer vision component for the inspection of product. Digital imagery for failure analysis is generated between process steps from optical microscopy and laser scattering systems and from confocal, SEM, atomic force microscope and focused ion beam imaging modalities. This data is maintained in a yield management database and used by fabrication engineers to diagnose and source manufacturing problems, verify human assertions regarding the state of the manufacturing process, and to train inexperienced personnel on the wide variety of failure mechanisms observed. Yet, the semiconductor industry currently has no direct means of searching the yield management database using image-based queries. The ability to query the fabrication process is based primarily on date, lot, and wafer identification number. Although this approach can be useful, it limits the user's ability to quickly locate historical information. For example, if SEM review has determined that a particular defect or pattern problem exists on a wafer, the yield engineer must query on dates, lots, and wafers to find similar historical instances. Although roughly 70% of all space occupied in the database consists of imagery, queries to locate imagery are manual, indirect, tedious, and inefficient. Therefore, this becomes an iterative and slow process that can prove unwieldy in the modern semiconductor environment where a single manufacturing campus having multiple fabrication facilities at one site can generate thousands of images daily. If a query method can be designed that allows the user to look for similar informational content, a faster and more focused result can be achieved. A process for locating similar imagery based on image content, for example the image structure rather than lot number, wafer identification, and date, would result in a reduced time-to-source. Hence, what is needed is a method for manufacturing-specific CBIR that addresses defect analysis, product quality control, and process understanding in the manufacturing environment.

SUMMARY OF THE INVENTION

A method and apparatus for indexing and retrieving manufacturing-specific digital imagery based on image content in accordance with the inventive arrangement satisfies the long-felt need of the prior art by providing manufacturing-specific, context based image retrieval in an industrial environment. In response to an industrial event, the inventive method can afford fast access to historical image-based records of similar industrial events so that a corrective action can be quickly taken. Thus, the inventive arrangements provide a method and apparatus for employing an image-based query-by-example method to locate and retrieve similar imagry from a database of digital imagery. The inventive arrangements have advantages over all content-based image retrieval systems, and provides a novel and nonobvious system and method for indexing and storing content-based, manufacturing-specific digital imagery for subsequent fast retrieval.

A method for indexing and retrieving manufacturing-specific digital images based on image content comprises three steps. First, at least one feature vector can be extracted from a manufacturing-specific digital image stored in an image database. In particular, each extracted feature vector corresponds to a particular characteristic of the manufacturing-specific digital image. The extracting step can comprise extracting three independent feature vectors, the three independent feature vectors corresponding to a digital image modality and overall characteristic, a substrate/background characteristic, and an anomaly/defect characteristic, respectively. Notably, the extracting step includes generating a defect mask using a detection process selected from the group consisting of thresholding the manufacturing-specific digital image, comparing the manufacturing-specific digital image with a golden template, and comparing the manufacturing-specific digital image with a digital image of a neighboring product; and, extracting a feature vector for the substrate/background characteristic or the anomaly/defect characteristic using the defect mask. Moreover, the extracting step can comprise the steps of: distinguishing a defect-region from a non-defect region in the manufacturing-specific digital image; rendering the defect-region similar to the non-defect region based on an estimate derived from a region surrounding the defect-region, the removal of which forms a modified manufacturing-specific digital image; and, extracting a feature vector corresponding to the substrate/background characteristic from the modified manufacturing-specific digital image.

Second, using an unsupervised clustering method, each extracted feature vector can be indexed in a hierarchical search tree. Specifically, the hierarchical search tree includes data encapsulating nodes. The nodes can be leaf nodes or level nodes. Each leaf node encapsulates a feature vector. In contrast, each level node references at least one additional node. Moreover, each level node encapsulates a vector average defined by the average value of all feature vectors and vector averages encapsulated by nodes referenced by the level node.

The using step can comprise the steps of: forming a subset of feature vectors, the subset including at least one feature vector; establishing a main branch in the hierarchical search tree, the main branch having at least one leaf node encapsulating a feature vector included in the subset of feature vectors; and, adding leaf nodes to the hierarchical search tree using a top-down algorithm. In the adding step, each additional leaf node encapsulates a feature vector exclusive of the subset of feature vectors.

Third, a manufacturing-specific digital image associated with a feature vector stored in the hierarchical search tree can be retrieved, wherein the manufacturing-specific digital image has image content comparably related to the image content of the query image. More particularly, the retrieving step includes several steps. First, the query image is converted into at least one query vector corresponding to a particular characteristic of the manufacturing image. Subsequently, a first-level data reduction of feature vectors stored in the hierarchical data structure can be performed based upon the query vector. The first-level data reduction preferably constructs a subset of the feature vectors comparable to the query vector.

Thereafter, relevance feedback can be accepted. Specifically, the relevance feedback can include a user-chosen selection of manufacturing-specific digital images corresponding to the subset of feature vectors. For each manufacturing-specific digital image in the selection, three independent feature vectors of manufacturing-based digital imagery can be extracted, the three independent feature vectors corresponding to a digital image modality and overall characteristic, a substrate/background characteristic, and an anomaly/defect characteristic, respectively. From the selection, at least one prototype vector can be calculated, the prototype vector corresponding to the particular characteristic of the manufacturing-specific digital image. Specifically, where three independent feature vectors of manufacturing-based digital imagery are extracted, each independent feature vector for each manufacturing-specific digital image in the selection can be logically combined, the logical combination forming the prototype vector for each independent feature vector.

Finally, a second-level data reduction based upon the prototype vector can be performed, the second-level data reduction resuting in a subset of the feature vectors comparable to the prototype vector, and further comparable to the query vector. Still, the retrieving step can further comprise the step of fetching from the image database a manufacturing-specific digital image defined by an intersection of the three independent feature vectors corresponding to the prototype vector.

In addition to the three steps, the inventive method can include a fourth step. The fourth step can include managing the hierarchical search tree. In particular, the managing step comprises the steps of: identifying a level node referencing redundant nodes having redundant feature vectors; equating the vector average encapsulated by the level node with all feature vectors and vector averages encapsulated by nodes referenced by the level node; and, purging the hierarchical search tree of the redundant nodes referenced by the level node.

BRIEF DESCRIPTION OF THE DRAWINGS

There are presently shown in the drawings embodiments which are presently preferred, it being understood, however, that the invention is not limited to the precise arrangements and instrumentalities shown.

FIG. 4 is a table listing features used to describe background, defect and global characteristics of an image.

DETAILED DESCRIPTION OF THE INVENTION

Figure 1:
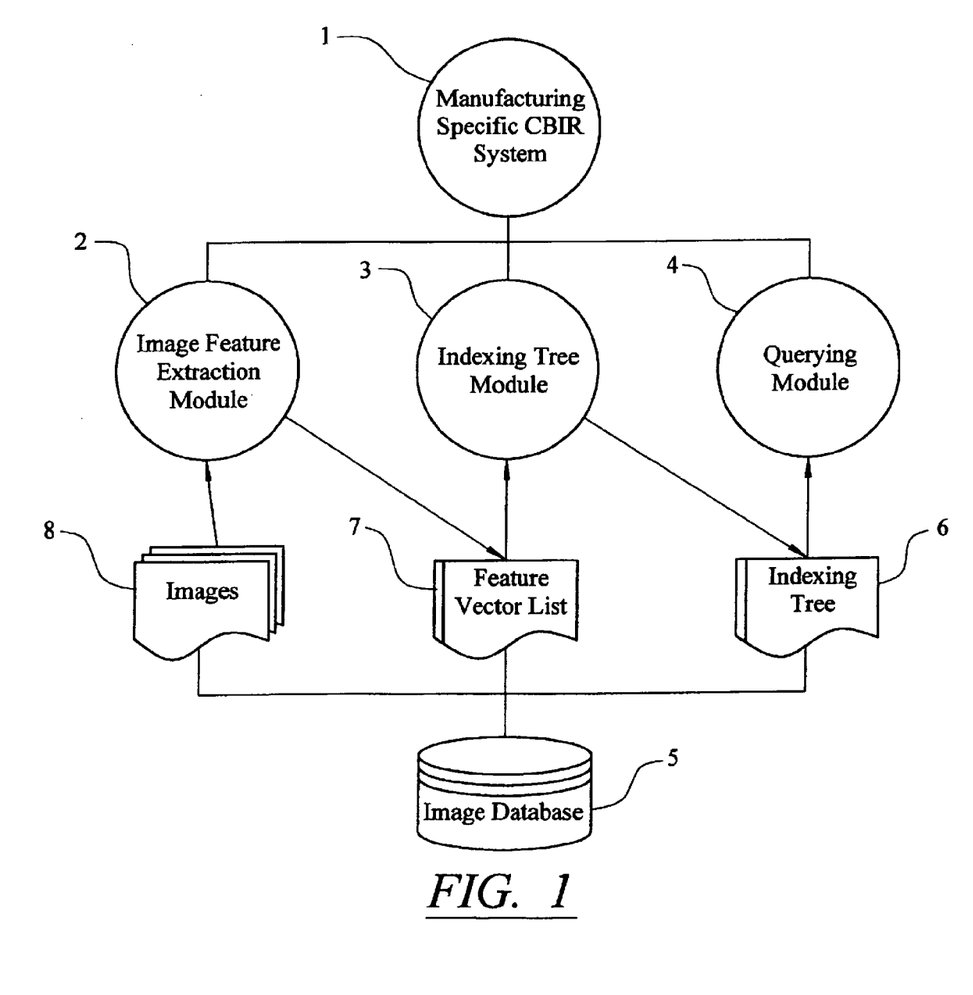
FIG. 1 is a schematic representation of a manufacturing-specific CBIR system in accordance with the inventive arrangement.

FIG. 1 illustrates a manufacturing-specific CBIR system 1 in accordance with the inventive arrangements. Specifically, a manufacturing-specific CBIR system 1 consists of an image database 5 having a collection of manufacturing-specific images and descriptive data corresponding to each stored image, as well as three basic modules, an image feature extraction module 2, an indexing module 3, and a querying module 4, each performing a required CBIR function. The image database 5 can contain, in addition to the collection of images, other process information that describes the manufacturing process, individual process tools and equipment, and the defect category or type.

Figure 2:
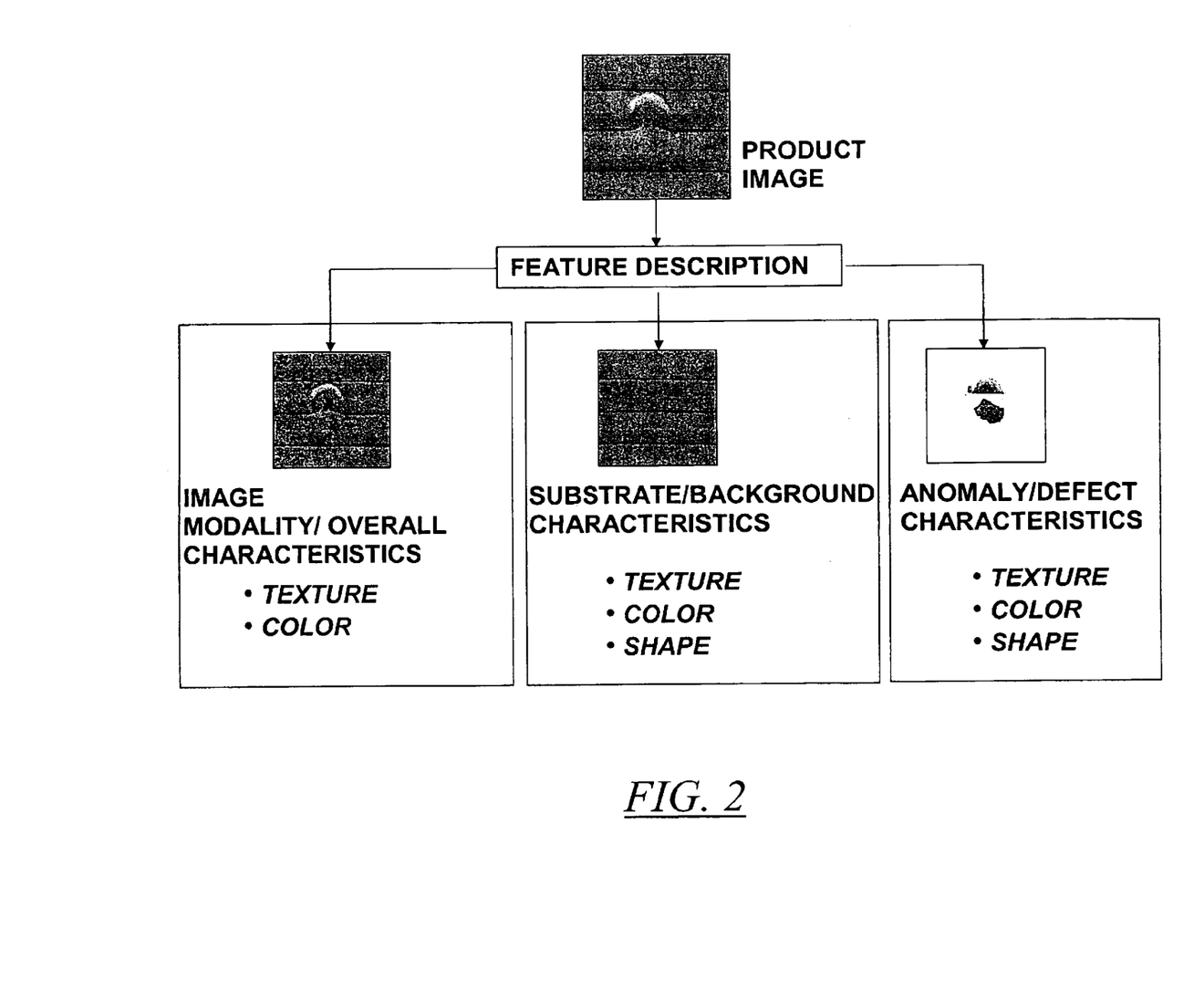
FIG. 2 is a schematic representation of the decomposition and description of a manufacturing image.

First, the image feature extraction module 2 can represent query and database images 8 in terms of a small number of numerical descriptors. Specifically, the image feature extraction module 2 can receive as an input, image 8. The image feature extraction module 2 can survey the image 8 deriving a vector of numerical descriptors corresponding to the image 8. Unlike prior CBIR systems, in the preferred embodiment, the manufacturing imagery can be described in terms of three independent sets of characteristics shown in FIG. 2. Specifically, the manufacturing image can be characterized in terms of image modality and overall characteristics, substrate-background characteristics, and anomoly-defect charcteristics. Moreover, the characteristics used to describe the modality, background, and defect are based on the texture, color, and shape of the image. In the preferred embodiment, the image feature extraction module 2 pre-processes every image in the image database 5 to generate a series of vectors having these descriptive set of features, each vector weighted to a particular characteristic of the stored image. Subsequently, the image feature extraction module 2 can store each of the series of vectors in a corresponding feature vector list 7, contained as part of the image database 5.

The second module forming the manufacturing-specific CBIR system 1, an indexing module 3, can generate a series of hierarchical search 6, each binary search hierarchical search tree 6 corresponding to a particular characteristic of a stored image. Specifically, the indexing module 3 can read a vector of numerical descriptors contained in a particular feature vector list 7, the vector corresponding to an image 8 stored in the image database 5. Subsequently, using an unsupervised clustering method, the indexing module 3 can create and insert a node containing the vector into a hierarchical search tree 6 keyed on the same image characteristic as the feature vector list 7. The indexing module 3 can perform the node insertion operation for each feature vector list 7 stored in the image database 5. Thus, each resulting hierarchical search tree 6 can provide for the rapid location of candidate imagery in the image database 5, each hierarchical search tree 6 weighted to a particular image characteristic.

The third module forming the manufacturing-specific CBIR system 1, a querying module 4, can accept a query image from a user and can return to the user, a collection of similar images stored in the image database 5. Specifically, the querying module 4 can perform an appropriate first level data reduction based upon the query image's associated vector of numerical descriptors. Significantly, the image feature extraction module 2, using the query image as an input, can generate the associated vector of numerical descriptors. Using the vector of numerical descriptors as a guideline, a very rapid traversal of indexing tree 6 in the first-level data reduction routine can produce a preliminary selection of matching images from the image database 5.

Subsequently, a relevance feedback routine contained within the querying module 4 can receive input from the user to further focus the image search to the most relevant images. In particular, the user can select several images contained in the preliminary selection of matching images, the selected images having similar charactistics to the query image. Following the relevance feedback procedure, a second level data reduction can be performed using the relevance feedback. Once the system has produced a reduced set of image descriptions, each image can be combined to provide the user with a vastly reduced set of images having similar characteristics to the query image.

Figure 3A:
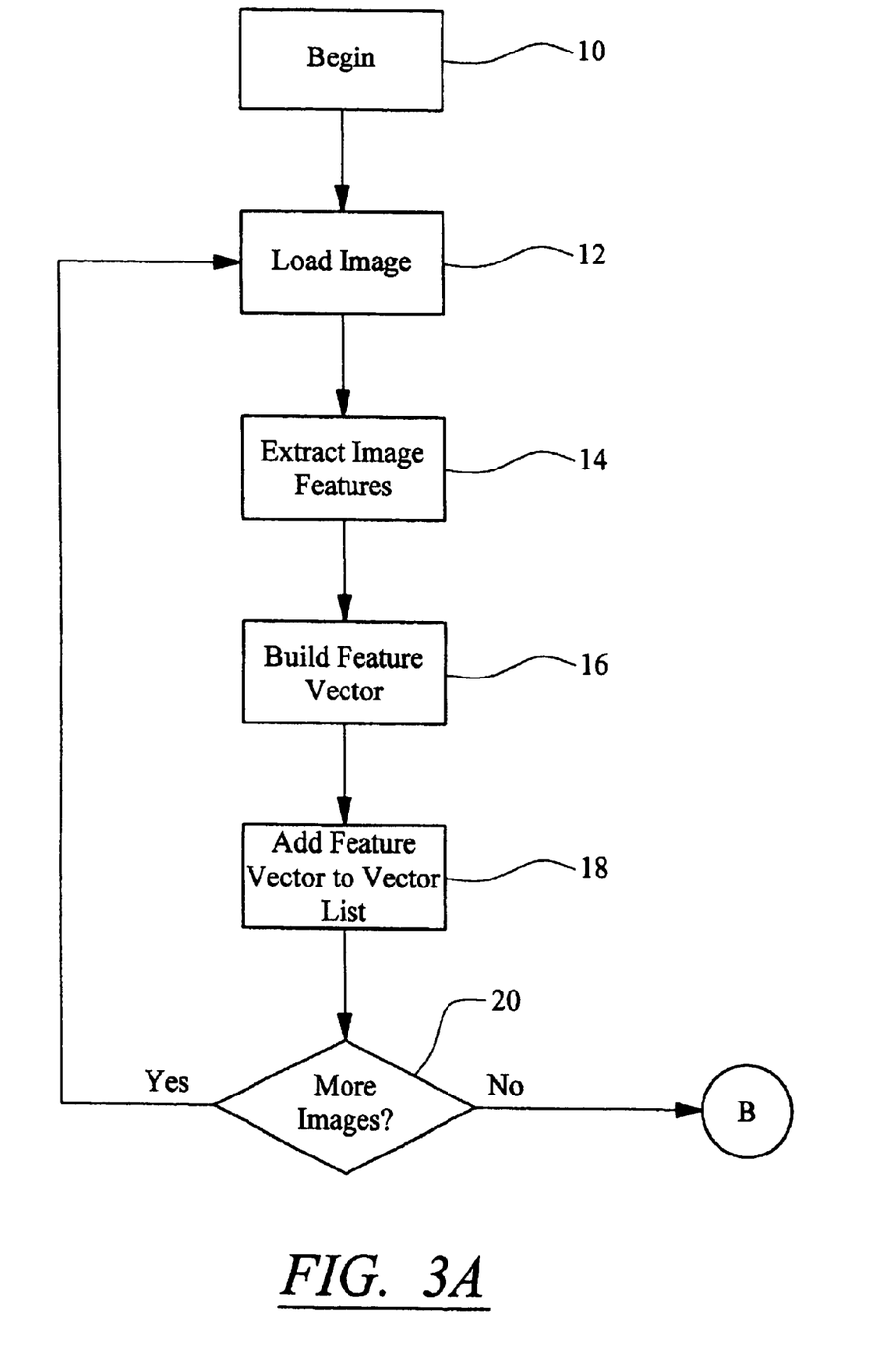
FIGS. 3A–3B, taken together, are a flow chart illustrating a method for indexing manufacturing-specific digital imagery.
Figure 3B:
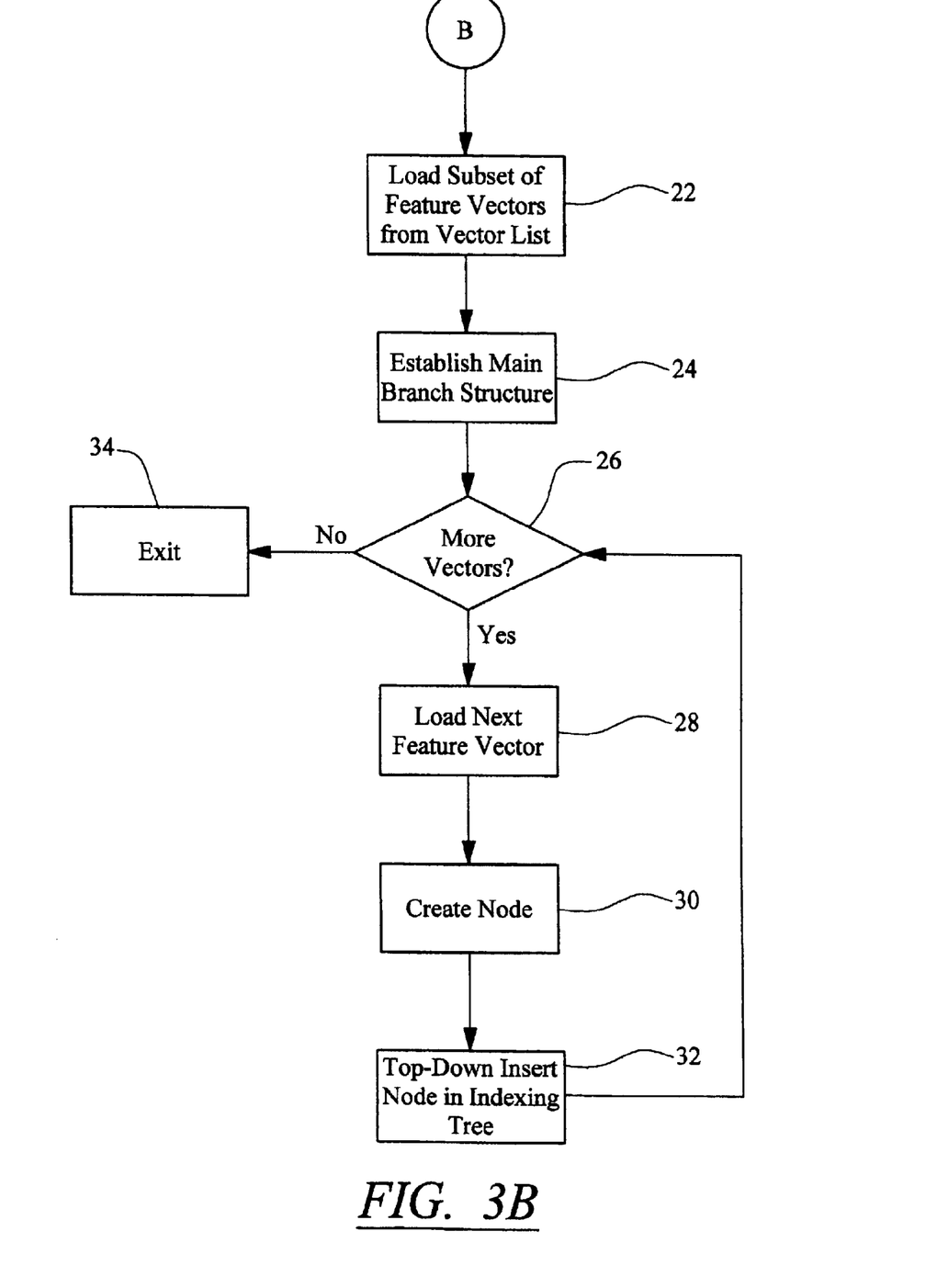

A method for indexing and retrieving manufacturing-specific digital imagery based on image content can be further subdivided into two processes: a method for indexing manufacturing-specific digital imagery; and, a method for retrieving manufacturing-specific digital imagery from an indexed image database. Both inventive methods can be developed for use on the Microsoft® Windows® 95/98/NT platform using widely-available development tools, for instance Microsoft Visual C++®. FIGS. 3A–3B, taken together, are a flow chart illustrating a method for indexing manufacturing-specific digital imagery. A method for indexing manufacturing-specific digital imagery begins in step 10 of FIG. 3A. In step 12, the image extraction module 2 can load an image 8 stored in the image database 5. Notably, the image 8 needn't be stored in any particular database. Rather, in the preferred embodiment, all images 8 stored in the image database merely are organized in one file directory on a computer.

In step 14, image feature extraction module 2 can extract image features pertinent to the manufacturing process. Specifically, the image feature extraction module 2 can extract modality features, background features and defect features. More particularly, the image feature extraction module 2 can define three unique and approximately independent feature vectors of manufacturing-specific digital imagery. The three feature vectors include an anomaly/defect characteristic, a substrate/background characteristic, and an image modality and global characteristic. The defect region can undergo additional masking of morphological features which include an inner mask, which is a solid white-on-black mask identifying the defect; an annular mask, consisting of one pixel inside the inner mask border, one pixel on the border, and one pixel outside the border; and, an outer mask, surrounding the outside of the annular mask by a specified number of pixels. Generally, only the inner mask is required for the feature extraction. Still, the other masks can be generated as needed. In addition, the planes of these images, for instance red, green, blue, or gray, can be specified. Alternatively, an edge-enhanced image, for instance as performed by a Sobel edge detection operation, can be specified. Finally, a special set of features can be generated solely from the inner mask.

The characteristics forming each feature vector as extracted by the image feature extraction module 2 can be grouped into descriptive categories: color, texture, and shape. Each feature contributing to the vector description can be generated by masking the image 8 and plane with an appropriate mask and measuring the feature according to appropriate equations. As an example, the table shown in FIG. 4 lists features measured from manufacturing imagery for CBIR analysis to describe defect, background, and global characteristics. These features can be described in terms of the color, shape, and texture of the area of interest. Still, the architecture is flexible and new descriptive features under continued investigation can be easily added.

The manufacturing-specific CBIR system 1 implements a series of mathematical equations to derive each feature vector. In these equations, described in detail herein, $f(x,y)$ is the region of the original image masked by $m(x,y)$, where $m(x,y)=1$ where the mask is white, for example when overlaying the object of interest. In all other cases, $m(x,y)=0$. One particular feature, the area of the inner mask, can be calculated using the following equation:

$$\text{Area} = \Sigma_x \Sigma_y m(x,y)$$

This area feature is useful for measuring the relative size of defects. Similarly, the perimeter feature is useful in measuring the relative size of defects. Moreover, the perimeter feature can form a component of other features. The perimeter of the defect can be measured by counting the pixels in the border of the mask.

Compactness measures the roundness of a defect. A perfect disc has minimal compactness of 1. In the manufacturing-specific CBIR system 1, the compactness of a feature can be measured by the formula $$compactness = \frac{(perimeter)^2}{4\pi(area)}$$

Elongation is a measure of the mask morphology. Whereas, a line has a high elongation, a disk has a low elongation. Elongation can be determined by fitting an ellipse to the data object, working with the major and minor axis. Elongation is computed using the following equation:

$$elongation = \frac{MajorAxis - MinorAxis}{MajorAxis + MinorAxis}$$

Geometric moments can be computed using the well-known relationship, $$m_{pq} = \Sigma_x \Sigma_y x^p y^q f(x,y)$$

where p and q are non-negative integers. The X centroid, $X_C$, and Y centroid, $Y_C$, are given by the values $$X_c = \frac{m_{10}}{m_{00}}, \quad Y_c = \frac{m_{01}}{m_{00}}$$

In the manufacturing-specific CBIR system 1, f(x,y) can be replaced with m(x,y), the mask of the defect. Thus, this feature assists in defining the defect location. Still, this feature can be of little use if the defect image is always centered or is always randomly located. To provide more information from the moment features, central moments can be computed from which other descriptive families of moments can be generated. Central moments can be computed by calculating:

$$\mu_{pq} = \Sigma_x \Sigma_y \left(x - \frac{m_{10}}{m_{00}}\right)^p \left(y - \frac{m_{01}}{m_{00}}\right)^q f(x,y)$$

Invariant moments are features derived from the central moments which can be used as image descriptors. Invariant moments can be particularly useful, for instance in describing the shape of an object while ignoring scale, position, and rotation. The manufacturing-specific CBIR system 1 uses the following formulas to derive invariant moments.

$$\phi_1 = \mu_{20} + \mu_{02}$$

$$\phi_2 = (\mu_{20} - \mu_{02})^2 + 4\mu_{11}^2$$

$$\phi_3 = (\mu_{30} - 3\mu_{12})^2 + (3\mu_{21} - \mu_{03})^2$$

$$\phi_4 = (\mu_{30} + \mu_{12})^2 + (\mu_{21} + \mu_{03})^2$$

$$\phi_5 = (\mu_{30} - 3\mu_{12})(\mu_{30} + \mu_{12})[(\mu_{30\mu_{12}})^2 - 3(\mu_{21} + \mu_{03})^2] +$$

$$(3\mu_{21} - \mu_{03})(\mu_{03} + \mu_{21})[3(\mu_{30} + \mu_{12})^2 - (\mu_{03} + \mu_{21})^2]$$

$$\phi_6 = (\mu_{20} - \mu_{02})[(\mu_{30} + \mu_{12})^2 - (\mu_{21} + \mu_{03})^2] + 4\mu_{11}(\mu_{30} + \mu_{12})(\mu_{21} + \mu_{03})$$

$$\phi_7 = (3\mu_{21} - \mu_{03})(\mu_{30} + \mu_{12})[(\mu_{30} + \mu_{12})^2 - 3(\mu_{21} + \mu_{03})^2] +$$

$$(3\mu_{12} - \mu_{30})(\mu_{03} + \mu_{21})[3(\mu_{30} + \mu_{12})^2 - (\mu_{03} + \mu_{21})^2]$$

Since the invariant moments can become very large, the absolute value of the moments can be taken and a logarithmic scaling can be applied thereto if the moment value exceeds 10, for instance, $\phi = 10 \log(\phi)$.

Finally, the following equations describe features which measure quantities about the gray scale levels within the masked area:

$$energy = \frac{1}{area} \Sigma_x \Sigma_y f^2(x,y)$$

$$average\ intensity = \frac{1}{area} \Sigma_x \Sigma_y f(x,y)$$

$$contrast = \frac{f(x,y)|_{max} - f(x,y)|_{min}}{f(x,y)|_{max} + f(x,y)|_{min}}$$

Significantly, and unique to the present invention, the system 1 capitalizes on widely-used and automatically generated defect masks which are an inherent component of the defect detection process. A defect mask is a representation of the segmentation of a defect or anomaly residing in a digital image of a manufactured product. The image feature extraction module 2 can develop each feature vector in step 16 by isolating the corresponding characteristic with the defect mask.

Figure 5:
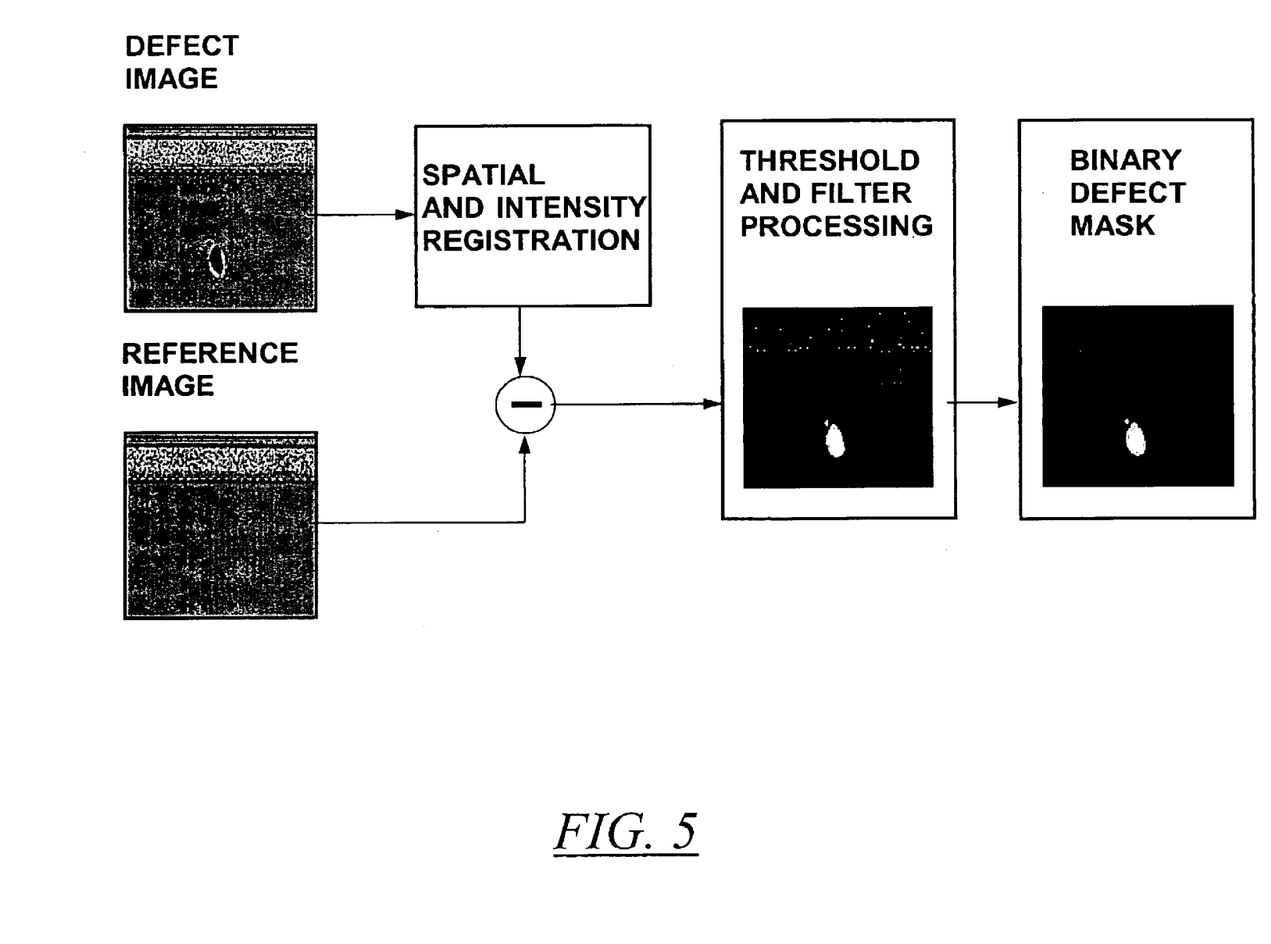
FIG. 5 is a schematic illustration of a typical computer vision process for detecting a defect between a test and reference image.

For example, FIG. 5 illustrates a typical computer vision process used to detect a defect between a test image 70 and a reference image 72. In the typical process, the reference image 72 is compared to the test image 70, the test image 70 first undergoing spatial and intensity registration 74. The resulting product can be further subjected to threshold and filter processing 76. The result is a binary defect mask 78 that segments the anomaly 80 from the expected image components.

Presently, numerous methods are employed for applying a defect detection mask to detect defects in a manufacturing-specific image, each which can be effectively employed by the system 1. Examples of known defect detection mask techniques follow. For instance, the threshold defect detection masks employs a simple threshold to detect deviations in an expected uniform background. The threshold process usually requires post filtering to remove small nuisance anomalies that arise due to image noise. The simple threshold method has been applied to continuously manufactured web products such as paper and film products, and unpatterned thick and thin-film ceramics.

Alternatively, the golden template defect detection technique utilizes a single reference image of a non-defective product which is maintained as a template for subtractive comparison followed by thresholding and filtering. The golden template method has been applied to the production of printed textiles, printed graphics, semiconductors, printed circuit boards, and patterned technical ceramics.

Another defect masking technique, the neighborhood template defect detection mask method, can use a dynamic reference image which is updated and maintained based on a neighboring product. This dynamic reference image is applied in the same manner as a golden template. Thus, as in the golden template method, the neighborhood template defect detecion mask can be applied to the production of printed textiles, printed graphics, semiconductors, printed circuit boards, and patterned technical ceramics.

In contrast, unlike the previous two actual image-based techniques, the CAD specification defect detection mask applies a grey-scale template derived from a CAD design specification. This is used in a similar manner to the golden template. This technique is especially useful for verifying dimensional specifications. The CAD specification technique finds particular application to the production of printed circuit boards, flexible printed circuit product, patterned technical ceramics, and multi-layer packages.

Finally, non-spatial techniques can be used to measure variations in characteristics such as texture or color to locate and segment anomalous conditions. These non-spatial techniques can be applied to products that exhibit non-geometric but statistically expected structure, for instance, non-woven textiles, unpatterned woven and knit textiles, and specialty paper products.

Using defect masks, the image feature extraction module 2 can develop each feature vector in step 16 by isolating the corresponding characteristic. Notably, the inventive method can further employ a defect filling technique to facilitate description of the background region of an image by removing the defect region based on an estimate derived from the surrounding regions. This defect filling method allows the background to be mathematically described so that other similar background geometries and structures and be retrieved. Subsequently, in step 18, each resulting feature vector can be added to a feature vector list 7. If in decision step 20, additional images remain to be characterized by the image extraction module 2, the process can repeat in step 12, wherein the image extraction module 2 can load another image 8 stored in the image database 5. However, in decision step 20, when no images 8 remain to be processed, passing through jump circle B to FIG. 3B, the manufacturing-specific CBIR system 1 can form a hierarchical search tree for sorting and storing each feature vector contained in each feature vector list 7.

Having created a series of feature vector lists 7 for images 8 stored in image database 5, the manufacturing-specific CBIR system 1 can initiate an indexing process which organizes the data into a hierarchical tree structure 6 allowing for rapid retrieval of imagery during the query process. Specifically, the manufacturing-specific CBIR system 1 employs feature indexing--a process by which the manufacturing-specific CBIR system 1 organizes feature vectors contained in each feature vector list 7 to facilitate rapid access and retrieval of similar imagery. The indexing technique is critical to the efficient retrieval of similar data from the software system. Unlike existing CBIR systems, the manufacturing-specific CBIR system 1 utilizes a sequential, agglomerative, hierarchical, non-overlapping [SAHN] algorithm for sorting the features contained in the feature vector list 7. Historically, the SAHN algorithm has been used as an investigative tool for unsupervised clustering in pattern recognition problems. For the CBIR application, SAHN algorithms are used to quickly reduce the number of feature vectors, $v_i$, that must be compared to the query vector, $Q_v$, during a retrieval operation.

Figure 6:
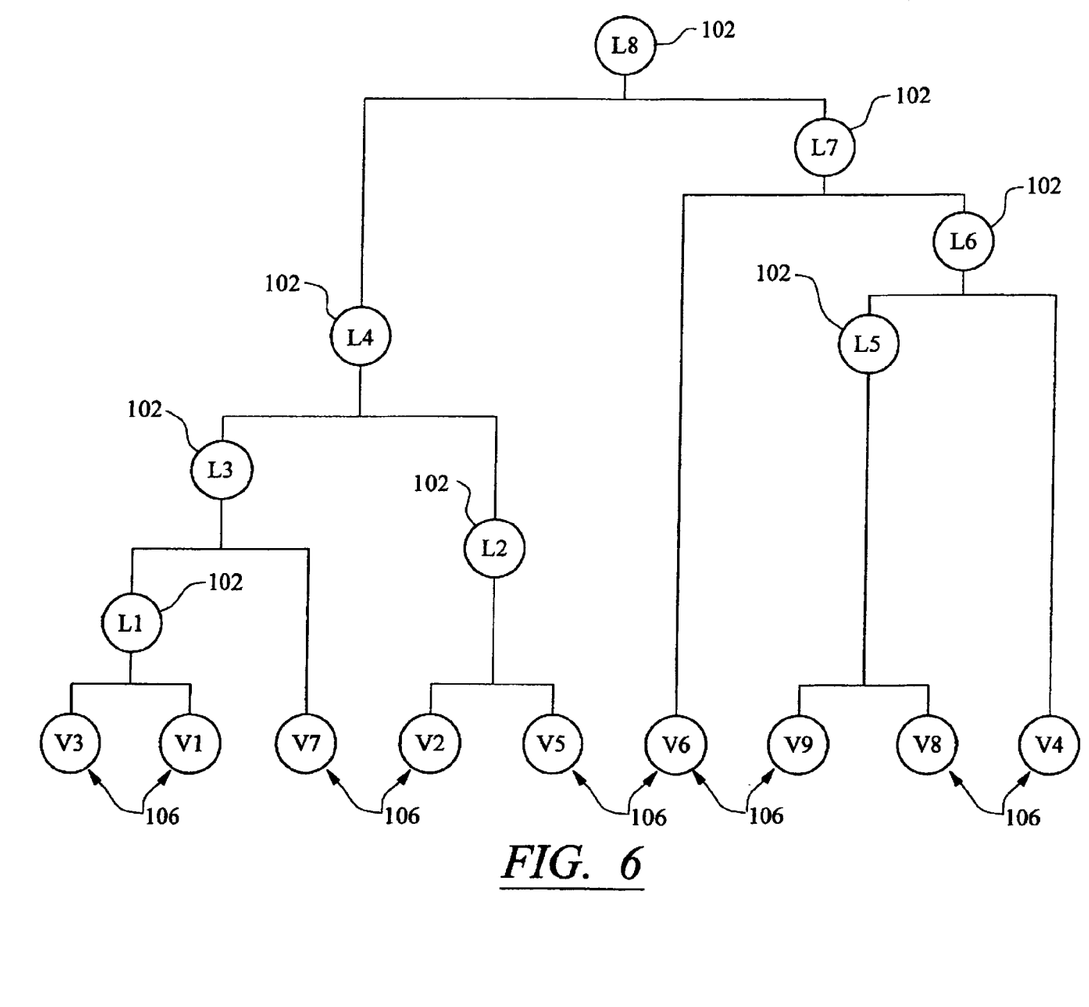
FIG. 6 is a tree diagram depicting a hierarchical search tree for use with the inventive method.

FIG. 6 shows a schematic representation of a hierarchically ordered set of feature vectors 106, $v_i$, i=1, 2, . . . 9. In the illustrated hierarchy, the vectors forming vector pair ($v_3$, $v_1$) have the most similar features to one another. Similarly, the features represented by vector pair ($v_2$, $v_5$) also have the most similar features to one another. The next closest pair of vectors($L_1$, $v_7$) maintain a lesser degree of similarity than vector pair ($v_3$, $v_1$), where $L_1$ 102 is the prototype of ($v_3$, $v_1$) at level 1 defined by the vector average, <$v_3$, $v_1$>.

Still, the illustrated hierarchy, when populated with a large number of vectors corresponding to a large image database can exhibit redundancy among similar images. Consequently, the redundancy measure can be used to drive the short-term usage of new image data or to facilitate data archiving for long-term storage, or data purging of data whose redundancy does not add value to the query process. Specifically, the $L_i$ prototype can be used to represent redundant images without loss of database value.

Each node in the indexing tree 6 is inserted into the indexing tree 6 according this hybrid tree-filling algorithm, unique to a manufacturing-specific CBIR. Specifically, tree filling is defined as the placement of each descriptive image vector in a location in the indexing tree 6. When creating the indexing tree 6, two basic tree-filling approaches are possible: "bottom up filling" where each vector in the feature vector list 7 is compared to every other vector to determine the closest match, and "top-down filling" where a vector is added to the tree by comparison to the level structure, $L_i$, from the top filling in the tree downward. From a clustering point of view, the bottom up approach is equivalent to a nearest-neighbor algorithm where closest neighbors are joined based on proximity within the n-dimensional feature space of the data. The top down approach can be analogous to a furthest-neighbor algorithm that can result in a similar clustering of the data but also vastly different clustering dependent on the distributions of points in the n-dimensional feature space, for instance elongated groups versus spherical, well separated groups. In essence, in a nearest-neighbor method, the growth of elongated clusters is encouraged while a furthest neighbor approach results in discouraging elongated clusters. Advantageously, in a top-down filling, the tree can be constructed and appended rapidly whereas in bottom-up filling the computational complexity is much greater. In particular, operations on an NxN similarity matrix, can rapidly become enormous for even a moderately sized image database of N images. Still, in top-down filling, appending the indexing tree 6 with new data requires a recalculation of the indexing tree 6.

To facilitate a nearest-neighbor response as well as rapid tree building and appending, the manufacturing-specific CBIR system 1 employs a strategy for tree filling as represented in FIG. 3B. The initial tree is built around a sub-set of the image feature database to establish the main branch structure in a nearest-neighbor sense. Tree construction is then completed by rapidly filling in the structure from the top-down with the remaining data. Specifically, in step 22, a randomly chosen subset of feature vectors from feature vector list 7 preferably are loaded. Subsequently, in step 24, the main branch structure of the hierarchical search tree 6 is established using leaf nodes to encapsulate each feature vector in the subset of feature vectors. After the initial tree is built, the process continues if, in decision step 26, additional feature vectors in the feature vector-list 7 remain to be inserted into the hierarchical search tree 6. In step 28, the next unprocessed feature vector in the feature vector list 7 is loaded, and, in step 30, a node encapsulating the feature vector is created. In step 32, the newly created node can be top-down inserted into the hierarchical search tree 6. The process repeats in step 26 until no unprocessed feature vectors remain in the feature vector list 7, at which point the indexing algorithm exits in step 34. In theory, seeding the tree from the bottom up establishes a minimum structure that models the desired nearest-neighbor method. Top-down filling then fills in the branches in rapid order around this basic structure.

When searching the tree, it is conceivable that a query vector, $Q_v$, could traverse a branch of the tree that does not lead to the most similar match. For example, in FIG. 6, a query vector $Q_v$ could be more similar to $L_4$ than $L_7$, but more similar to $L_5$ than $L_4$. In this example, a top down search could lead the query down a branch, or partition, that is not the most similar. Thus, to reduce this probability, the manufacturing-specific CBIR system 1 utilizes a multi-level tree searching technique as shown in FIG. 6. To assist during the searching process, the SAHN algorithm partitions, or clusters, the image data into non-overlapping groups of vectors, for example, each branch of the tree can only refer to a feature vector one time. As a result, the vector average stored in a level node 102 at level $L_i$ is representative of the partitioned vectors 106 below that level. At each level of the search, the criterion includes at least the number of levels between the top-most branching nodes, for example $L_4$ through $L_7$, and possibly more nodes as specified by the user, for example the same number of nodes below the bottom-most node. The result is a higher likelihood of finding the most similar imagery associated with a query.

Subsequent to the generation of each feature vector list 7 and corresponding hierarchical search tree 6, both the feature vector list 7 and the hierarchical search tree 6 are maintained for use during the retrieval process. In particular, as new images 8 are added to the image database 5, each feature vector list 7 and the hierarchical search tree 6 are updated accordingly. As in the tree-filling case, appending new vectors to the hierarchical search tree 6 is also completed using a top-down approach.

Figure 7:
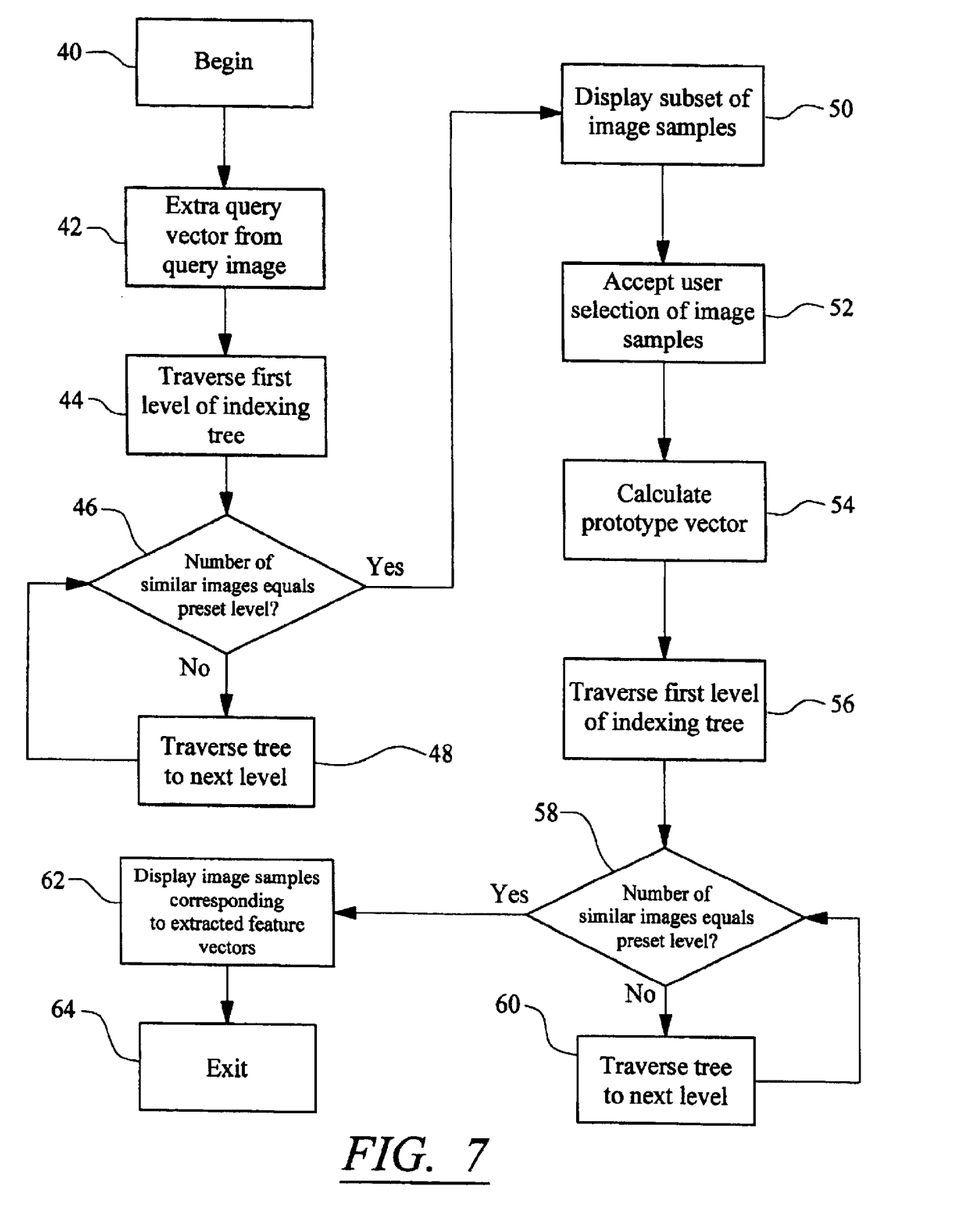
FIG. 7 is a flow chart illustrating a method for retrieving manufacturing-specific digital imagery from an indexed image database.

FIG. 7 is a flow chart illustrating a method for retrieving manufacturing-specific digital imagery from an indexed image database. Beginning with step 40, once a feature vector list 7 and hierarchical search tree 6 are established for each relevant feature, a user can perform a query by presenting the manufacturing-specific CBIR system 1 with a query image. The image retrieval process is in actuality a feature vector retrieval process. The image can be submitted as a query after, in step 42, conversion to a series of feature vectors analogous to those defined in the feature vector list 7. By passing the query image through the hierarchical search tree 6, a subset of the images can be rapidly obtained, the query image sharing similar feature characteristics.

Specifically, in step 44 a first level of the hierarchical search tree 6 can be traversed by comparing the query vector, $Q_v$ to the database of feature vectors, $v_i$, i=0, 1, . . . N−1 (where N is the total number of images in the database) is the L-norm distance metric given by $\|Q_v - v_i\|$. In the present invention, the Euclidean distance definition is applied where $\|Q_v - v_i\| = [(Q_v - v_i)^2]^{1/2}$. Still, an exhaustive algorithmic comparison of the query vector, $Q_v$, to all feature vectors, $v_i$, in the set has an algorithmic complexity of O(N), which would be time consuming at best considering the potential size of the image database and the broad range of queries that a user could perform.

Yet, for the CBIR application, SAHN algorithms are used to quickly reduce the number of feature vectors, $v_i$, that must be compared to the query vector, $Q_v$. A query search is performed by comparing the query vector, $Q_v$, to the top-most prototype pair in the tree, and traversing the most similar branch until the number of vectors below the node equals the number of similar matches requested. In the example of FIG. 6, this equates to a comparison to $L_7$ and $L_4$. If $L_4$ is the closest prototype then the next comparison will be to $L_2$ and $L_3$, until the desired number of images is represented below the most similar node. These images can be retrieved for further visualization and analysis during the relevance feedback and analysis stage. Unlike an exhaustive algorithmic comparison of the query vector, $Q_v$, to all feature vectors, $v_i$, the efficiency in searching the SAHN tree is of $O(\log_2(N))$, which, for a database of 100,000 images would be 6,021 times faster than an exhaustive O(N) search. If in step 46, the number of images stored below the present level node 102 exceeds a desired number of similar matches requested by the user, in step 48, an additional level of the hierarchical search tree 6 can be traversed. The process can repeat until the number of images stored below the present level node 102 equals the number of similar matches requested.

As a first feedback technique, in step 50, the subset can presented to the user so that other relevant images can be selected. Relevance images are those that are considered by the user to strengthen the query by providing stronger examples of the desired characteristics, for example defect type or substrate structure. The relevance imagery can be used to weight the query process more heavily towards those characteristics that the user is attempting to locate in the image database 5. The relevance process is iterative and the user, in step 52, can select relevant imagery from which a new prototype vector can be calculated. In step 56, a new initial traversal of the indexing tree 6 is performed. As before, in decision step 58, if the number of images stored below the present level exceeds a desired number of similar matches requested by the user, in step 60, an additional level of the indexing tree 6 can be traversed. The process can repeat until the number of images stored below the present level node 102 equals the number of similar matches requested.

One skilled in the art will recognize that a more accurate search can be performed, at the expense of maximum expediency, by allowing the user to continue to select new relevant imagery after each pass through the hierarchical search tree 6. When the user submits a query based on the image/vector $Q_v$, the manufacturing-specific CBIR system 1 returns all image vectors below some level node $L_i$ where the closest match occurs. The images that are returned may contain several other images that have the potential to strengthen, or better describe, the initial query. By modifying the search vector, $Q_v$, based on these similar images, the user is assigning relevance to the new data through manual association. This relevance information is used to modify $Q_v$, to give a new query vector, $Q_v'$, based on a prototype composed of the original and relevance data, and it is used to modify the tree search criteria. As a final result, the manufacturing-specific CBIR system 1 in step 62 can present to the user a list of images that approximately match the user's query and relevance requirements. Moreover, the list of images can be displayed with a similarity metric indicating how similar the results are to the original query image. Subsequently, the method can exit in step 64.

Figure 8:
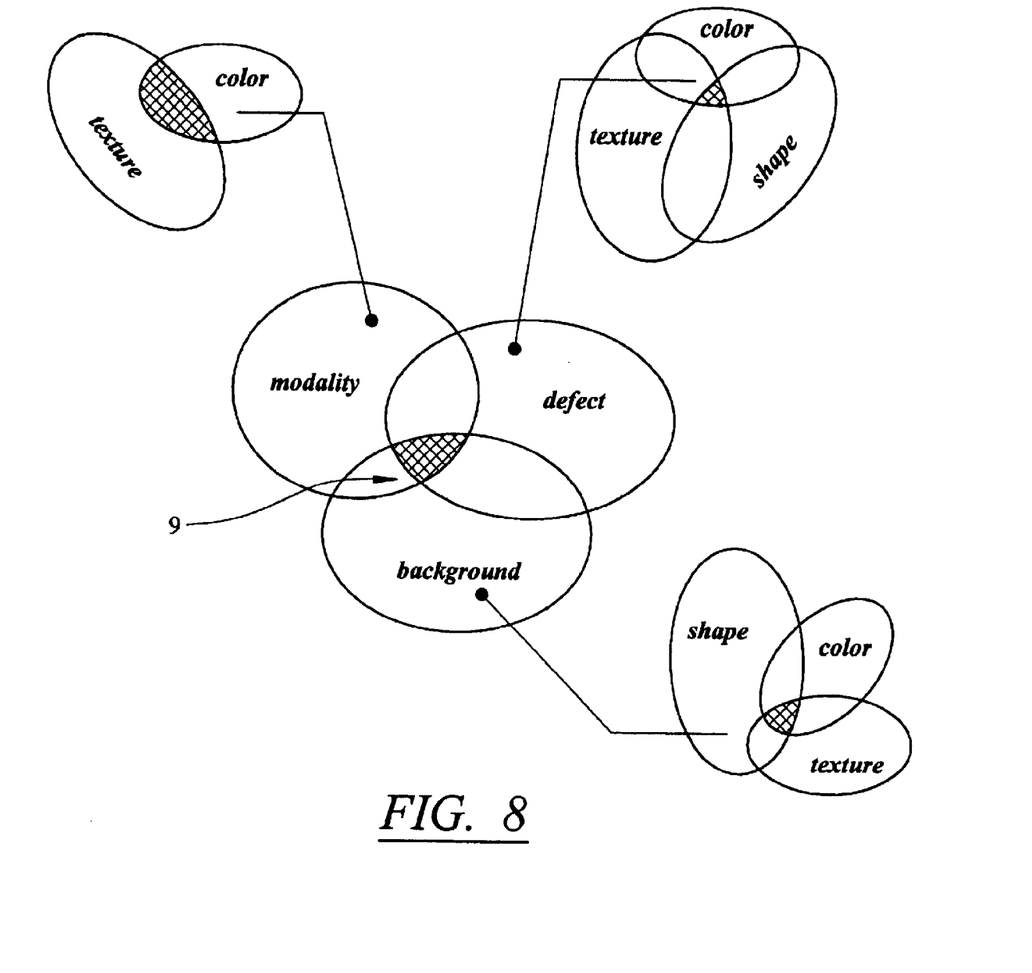
FIG. 8 is a Venn diagram showing the region of best match between a test query image and relevance images for all image descriptions.

A second feedback technique treats the relevance data problem as a binary decision by comparing the relevance data set, $\{Q_v, v_a, v_b, v_c, \ldots\}$ to all other data in the $L_i$ group as "correct" versus "incorrect" data. This approach is used to reduce the number of decision tree groups required to describe the relevance data set. FIG. 8 shows the decision space associated with the indexing process for defect, background, and global descriptions. Notably, the retrieval process is considered a logical combination of the eight decision trees shown: three for defect (texture, shape, and color), three for background (texture, shape, and color), and two for global (texture and color). The number of hierarchical search trees required to implement a query is made to be dependent on the relevance data. By comparing the relevance set, $\{Q_v, v_a, v_b, v_c, \ldots\}$, to all other data below $L_i$, it can be determined that only a subset of hierarchical search trees best match the users needs for the particular query. For example, a set of data may show that background color and global texture are not relevant to the current query. The result is a paring down of the hierarchical search tree set prior to a resubmission of $Q_v'$. The result of applying these relevance feedback techniques in the query process is the ability to achieve a focused search over a broad range of query categories. In consequence, many different users can perform vastly different queries from system while achieving specific target search goals.

As a result, it is an object of the inventive method to provide end-user support for human-level assertions for sourcing manufacturing problems. Specifically, the inventive method can assist with off-line review and analysis of unclassifiable defects, provide assisted defect library generation for supervised automatic defect classification systems, provide unsupervised classification of defects during early yield learning, and, assist in training yield management personnel. The three unique and approximately independent feature vectors allow the user to perform a broad variety of focused, detailed searches based on specific image queries.

It is a further object of the inventive method to capitalize on defect detection masks which are an inherent component of the defect detection process in current commercial systems. Significantly, no other known CBIR systems take advantage of the defect detection mask to assist in the image description and retrieval process. The inventive method can further employ a defect filling technique to facilitate description of the background region of an image by removing the defect region based on an estimate derived from the surrounding regions. This defect filling method allows the background to be mathematically described so that other similar background geometries and structures and be retrieved.

Finally, the inventive method can apply an unsupervised clustering method such as the hierarchical search tree to achieve a first-level reduction of the image data based on the unique image descriptions of modality, background, and defect. The hierarchical search tree allows for rapid and reliable data reduction based on the query image and provides data for logical combination. Moreover, a relevance mechanism can be applied for a second-level data reduction which uses a nearest-prototype method that incorporates the user-selected relevant imagery to further reduce the number of images in the subset. Advantageously, the hierarchical search tree 6 structure permits the reduction of image redundancy by controlling the storage, archiving, and purging of image data in a large image database as a function of the manufacturing-specific CBIR system 1 indexing method.

What is claimed is:

1. A method for indexing and retrieving stored images based on image content, comprising the steps of:

extracting a plurality of feature vectors from each of a plurality of digital images of in-process or completed semiconductors, said plurality of feature vectors corresponding to distinct descriptive characteristics of said semiconductor images;

recording said plurality of feature vectors from said plurality of semiconductor images;

indexing said plurality of feature vectors from said plurality of semiconductor images using an image clustering method to produce a hierarchical search tree, said clustering method mapping said plurality of images into a set of groups based on similar imaging content, said groups numbering less than a number of said plurality of images, said hierarchical search tree constituting a searchable library of said semiconductor images, wherein searching is based on said groups to achieve efficient retrieval times from said library;

extracting a plurality of said feature vectors from a query image, retrieving at least one image from said library based on an image similarity criterion to said feature vectors of said query image, and displaying said at least one image.

2. The method according to claim 1, wherein said extracting steps comprise the step of extracting three feature vectors, said three feature vectors corresponding to an image measurement tool, a substrate/background characteristic, and an anomaly/defect characteristic.

3. The method according to claim 2, wherein said extracting steps comprise the steps of:

using a defect mask provided by a detection process selected from the group consisting of thresholding said semiconductor image, comparing said semiconductor image with a golden template, and comparing said semiconductor image with a digital image of a neighboring product; and, extracting a feature vector for said substrate/background characteristic or said anomaly/defect characteristic using said defect mask.

4. The method according to claim 2, wherein said extracting steps comprise the steps of:

distinguishing a defect-region from a non-defect region in said semiconductor image;

rendering said defect-region similar to said non-defect region based on an estimate derived from a region surrounding said defect-region, said rendering forming a modified semiconductor image representing an unperturbed substrate/background; and, extracting a feature vector corresponding to said substrate/background characteristic from said modified semiconductor image.

5. The method according to claim 1, wherein the retrieving step comprises the steps of:

converting a query image into at least one query vector corresponding to said particular characteristic of said semiconductor image;

performing a first-level data reduction of feature vectors stored in said hierarchical data structure, said first-level data reduction based upon said at least one query vector, said first-level data reduction forming a subset of said feature vectors comparable to said query vector;

accepting relevance feedback comprising a user-chosen selection of semiconductor images corresponding to said subset of feature vectors;

calculating at least one prototype vector from said selection, said prototype vector corresponding to said particular characteristic of said semiconductor image; and, performing a second-level data reduction of feature vectors stored in said hierarchical data structure, said second-level data reduction based upon said at least one prototype vector, said second-level data reduction forming a subset of said feature vectors comparable to said at least one prototype vector, and further comparable to said at least one query vector.

6. The method of claim 1, wherein said at least one image retrieved in said retrieving step comprises a plurality of retrieved images.

7. The method of claim 6, wherein respective ones of said plurality of retrieved images are ranked in similarity relative to said query image.

8. The method according to claim 1, further comprising the step of managing said hierarchical search tree.

9. The method according to claim 8, wherein the managing step comprises the steps of:

identifying a level node referencing redundant nodes having redundant feature vectors;

equating the vector average encapsulated by said level node with all feature vectors and vector averages encapsulated by nodes referenced by said level node; and, pruning said hierarchical search tree of said redundant nodes referenced by said level node.

10. A method for indexing and retrieving manufacturing-specific digital images based on image content comprising the steps of:

extracting at least one feature vector from a manufacturing-specific digital image stored in an image database, said at least one feature vector corresponding to a particular characteristic of said manufacturing-specific image;

using an unsupervised clustering method to index said at least one feature vector in a hierarchical search tree; and, retrieving a manufacturing-specific image corresponding to a feature vector stored in said hierarchical search tree, said manufacturing-specific image having image content comparably related to image content of a query image, wherein the retrieving step comprises the steps of:

converting a query image into at least one query vector corresponding to said particular characteristic of said manufacturing-specific digital image;

performing a first-level data reduction of feature vectors stored in said hierarchical data structure, said first-level data reduction based upon said at least one query vector, said first-level data reduction forming a subset of said feature vectors comparable to said query vector;

accepting relevance feedback comprising a user-chosen selection of manufacturing-specific digital images corresponding to said subset of feature vectors, wherein the accepting step comprises the steps of:

for each manufacturing-specific digital image in said selection, extracting three independent feature vectors of manufacturing-based digital imagery, said three independent feature vectors corresponding to a digital image modality and overall characteristic, a substrate/background characteristic, and an anomaly/defect characteristic;

logically combining each said independent feature vector for each manufacturing-specific digital image in said selection, said logical combination forming a prototype vector for each said independent feature vector;

calculating at least one prototype vector from said selection, said prototype vector corresponding to said particular characteristic of said manufacturing-specific digital image; and, performing a second-level data reduction of feature vectors stored in said hierarchical data structure, said second-level data reduction based upon said at least one prototype vector, said second-level data reduction forming a subset of said feature vectors comparable to said at least one prototype vector, and further comparable to said at least one query vector.

11. The method according to claim 10, wherein the retrieving step further comprises the step of fetching from said image database a manufacturing-specific digital image defined by an intersection of said three independent feature vectors corresponding to said at least one prototype vector.

12. A computer apparatus programmed with a routine set of instructions stored in a fixed medium, said computer apparatus comprising:

means for extracting a plurality of feature vectors from each of a plurality of digital images of in-process or completed semiconductors, said plurality of feature vectors corresponding to distinct descriptive characteristics of said semiconductor images;

means for recording said plurality of feature vectors from said plurality of semiconductor images;

means for indexing said plurality of feature vectors from said plurality of semiconductor images using an image clustering method to produce a hierarchical search tree, said clustering method mapping said plurality of images into a set of groups based on similar image content, said groups numbering less than a number of said plurality of images, said hierarchical search tree being a searchable library of said semiconductor images, wherein searching is based on said groups to achieve efficient retrieval times from said library;

means for extracting at least one of said feature vectors from said query image, means for retrieving at least one image from said library based on an image similarity criterion to said feature vector of said query image, and means for displaying said at least one image.

13. The computer apparatus according to claim 12, wherein said extracting means comprise the means for extracting three independent feature vectors, said three independent feature vectors corresponding to an image measurement tool, a substrate/background characteristic, and an anomaly/defect characteristic, respectively.

14. The computer apparatus according to claim 13, wherein said extracting means comprise:

means for using a defect mask provided by a detection process selected from the group consisting of thresholding said semiconductor image, comparing said semiconductor image with a golden template, and comparing said semiconductor image with a digital image of a neighboring product; and, means for extracting a feature vector for said substrate/background characteristic or said anomaly/defect characteristic using said defect mask.

15. The computer apparatus according to claim 13, wherein said extracting means comprise:

means for distinguishing a defect-region from a non-defect region in said semiconductor image;

means for rendering said defect-region similar to said non-defect region based on an estimate derived from a region surrounding said defect-region, said rendering means forming a modified semiconductor image representing an unperturbed substrate/background; and, means for extracting a feature vector corresponding to said substrate/background characteristic from said modified semiconductor image.

16. The computer apparatus according to claim 12, wherein the retrieving means comprises:

means for converting a query image into at least one query vector corresponding to said particular characteristic of said semiconductor image;

means for performing a first-level data reduction of feature vectors stored in said hierarchical data structure, said first-level data reduction based upon said at least one query vector, said first-level data reduction forming a subset of said feature vectors comparable to said query vector;

means for accepting relevance feedback comprising a user-chosen selection of semiconductor images corresponding to said subset of feature vectors;

means for calculating at least one prototype vector from said selection, said prototype vector corresponding to said particular characteristic of said semiconductor image; and, means for performing a second-level data reduction of feature vectors stored in said hierarchical data structure, said second-level data reduction based upon said at least one prototype vector, said second-level data reduction forming a subset of said feature vectors comparable to said at least one prototype vector, and further comparable to said at least one query vector.

17. The computer apparatus according to claim 12, further comprising means for managing said hierarchical search tree.

18. The computer apparatus according to claim 17, wherein the managing means comprises:

means for identifying a level node referencing redundant nodes having redundant feature vectors;

means for equating the vector average encapsulated by said level node with all feature vectors and vector averages encapsulated by nodes referenced by said level node; and, means for pruning said hierarchical search tree of said redundant nodes referenced by said level node.

19. A computer apparatus programmed with a routine set of instructions stored in a fixed medium, said computer apparatus comprising:

means for extracting at least one feature vector from a manufacturing-specific digital image stored in an image database, said at least one feature vector corresponding to a particular characteristic of said manufacturing-specific image;

means for using an unsupervised clustering method to index said at least one feature vector in a hierarchical search tree;

means for retrieving a manufacturing-specific image corresponding to a feature vector stored in said hierarchical search tree, said manufacturing-specific image having image content comparably related to image content of a query image, wherein the retrieving means comprises:

means for converting a query image into at least one query vector corresponding to said particular characteristic of said manufacturing-specific digital image;

means for performing a first-level data reduction of feature vectors stored in said hierarchical data structure, said first-level data reduction based upon said at least one query vector, said first-level data reduction forming a subset of said feature vectors comparable to said query vector;

means for accepting relevance feedback comprising a user-chosen selection of manufacturing-specific digital images corresponding to said subset of feature vectors, wherein the accepting means comprises:

for each manufacturing-specific digital image in said selection, means for extracting three independent feature vectors of manufacturing-based digital imagery, said three independent feature vectors corresponding to a digital image modality and overall characteristic, a substrate/background characteristic, and an anomaly/defect characteristic;

means for logically combining each said independent feature vector for each manufacturing-specific digital image in said selection, said logical combination forming a prototype vector for each said independent feature vector;

means for calculating at least one prototype vector from said selection, said prototype vector corresponding to said particular characteristic of said manufacturing-specific digital image; and, means for performing a second-level data reduction of feature vectors stored in said hierarchical data structure, said second-level data reduction based upon said at least one prototype vector, said second-level data reduction forming a subset of said feature vectors comparable to said at least one prototype vector, and further comparable to said at least one query vector.

20. The computer apparatus according to claim 19, wherein the retrieving means further comprises means for fetching from said image database a manufacturing-specific digital image defined by an intersection of said three independent feature vectors corresponding to said at least one prototype vector.

21. A method of content-based image retrieval (CBIR) for manufacturing, comprising the steps of:

extracting a plurality of descriptive features from each of a plurality of digital images which represent in-process or completed semiconductors, said images obtained from a plurality of different measurement tools at a plurality of different manufacturing steps;

recording said plurality of descriptive features to form a historical image collection;

indexing said historical image collection using an image clustering method to produce a hierarchical search tree, said clustering method mapping said plurality of imaging into a set of groups based on similar image content, said groups numbering less than a number of said plurality of images, said hierarchical search tree constituting a searchable library of said semiconductor images, wherein searching is based on said groups to achieve efficient retrieval times from said library;

extracting said query image from an in-process or completed manufactured article to be characterized, said query image comprising a plurality of said descriptive features, retrieving at least one candidate image from said library based on an image similarity criterion to said descriptive features of said query image, and displaying said at least one image.

22. The method of claim 21, wherein said plurality of descriptive features comprise color, texture and shape.

23. The method of claim 21, wherein said plurality of different measurement tools include at least one optical microscope and at least one scanning electron microscope (SEM).

24. The method of claim 21, wherein said at least one candidate image retrieved in said retrieving step comprises a plurality of retrieved images.

25. The method of claim 24, wherein respective ones of said plurality of retrieved candidate images are ranked in similarity relative to said query image.

* * * * *